Aug. 22, 1967     H. L. HUELSTER     3,336,951
GROOVED INSULATING MATERIAL
Filed April 27, 1964
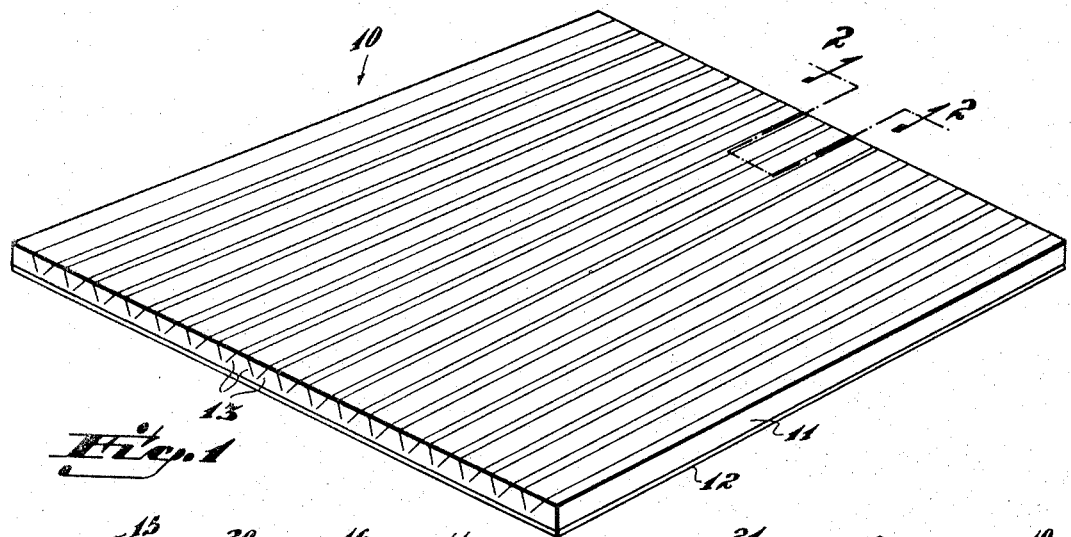
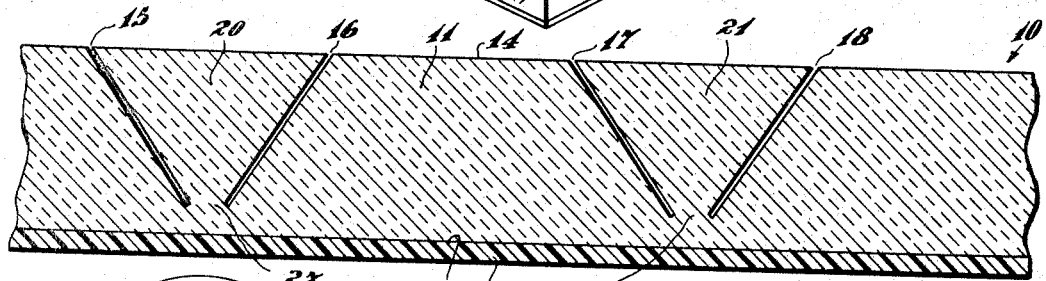
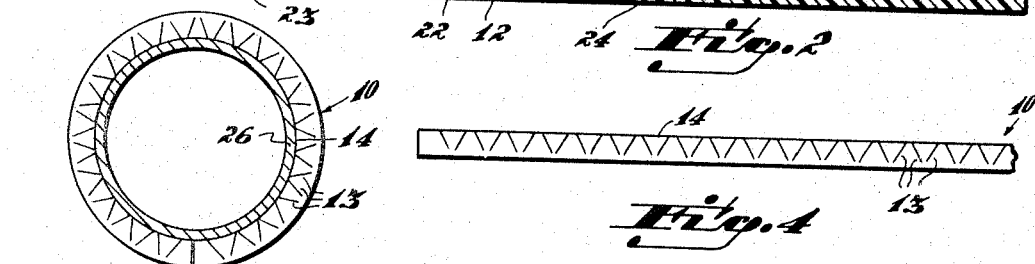
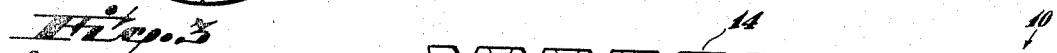
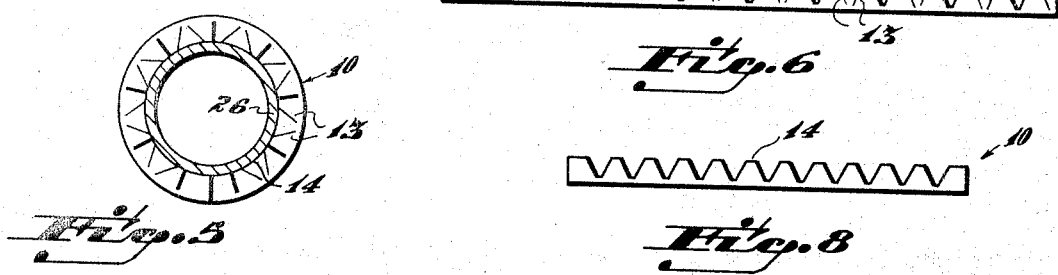
INVENTOR.
Herman L. Huelster
BY
Wood, Herron and Evans
ATTORNEYS

# United States Patent Office 3,336,951
Patented Aug. 22, 1967

3,336,951
GROOVED INSULATING MATERIAL
Herman L. Huelster, Joplin, Mo., assignor to The Eagle-Picher Company, Cincinnati, Ohio, a corporation of Ohio
Filed Apr. 27, 1964, Ser. No. 362,824
2 Claims. (Cl. 138—137)

This invention relates to insulation material and is particularly directed to a novel insulating material which is adapted for use either as a flat sheet or as a covering for pipes and other curved surfaces of various sizes.

The principal object of the present invention is to provide a novel fibrous or molded insulating material which can be shipped to the job site in a flat condition and which can be used in this condition where a planar insulating sheet is required; or alternatively can readily be modified at the job site to accommodate it for use in covering pipes and other articles of various curvatures.

One of the principal difficulties now confronting an installer of insulating material is the difficulty of fitting pipes of various diameters. This difficulty is due to the fact that when a thick insulating layer is wrapped around a pipe, the outside circumference of the cover is substantially greater than the inside circumference. Consequently, considerable material must be removed from the inner portions of the cover in order to permit the insulating material to properly fit around the pipe. For example, if a four inch pipe is covered with a two inch layer of insulating material, the outside circumference of the insulating material is approximately 26.7 inches, while the inside circumference is approximately 14.1 inches. Thus, a total of approximately 12.5 inches must be removed from the inside circumference of the insulating material. On the other hand, if a ten inch pipe is to be covered with two inches of insulation, considerably less material must be removed, since the outside circumference of the insulating material would be approximately 46.4 inches and the inside circumference would be 40 inches.

In the past, the installer of insulation material has either cut wedges from the material with a table saw or has purchased material which is already of wedged configuration. In the first instance, considerable time is expended in cutting the wedges from the material. If pre-shaped wedge material is utilized, the material has the disadvantage that a given sheet is useful to cover only a certain very limited range of sizes of pipe. The sheet cannot be used in a flat condition because of the objectionable voids corresponding to the removed wedges. Similarly, if a sheet is pre-cut to properly fit an intermediate size pipe, the sheet will leave voids when wrapped around a large pipe and will not have sufficient material removed to enable it to be wrapped around a small diameter pipe.

The present invention is predicated upon the concept of providing an insulating sheet having a plurality of parallel pairs of grooves formed therein. The grooves, which are formed by the manufacturer, are angulated toward each other to define a series of V-shaped wedges. However, the grooves do not pass completely through the material and do not meet one another. Consequently, the wedges are retained integral with the remaining portions of the sheet by a narrow strip lying along the inner edge of the wedge.

A sheet of the present type can be utilized as a flat sheet of insulating material since the wedges are held intact with the main body of the sheet and no objectionable voids are present. Alternatively, the sheet may be wrapped around a pipe, of relatively large diameter, without further modification. When the sheet is wrapped around such a pipe, the grooves defining the wedges close along the inner surface of the pipe to take up the excess insulating material and provide a smooth fit.

Additionally, the insulating material can be used on a pipe of intermediate size, for example eight inches, by removing some of the wedges, for example every other wedge. This is quickly accomplished at the job site either by manually tearing the wedges from the sheet or by running a sharp tool along the bottom of the wedges, severing the narrow strip joining the wedges to the remainder of the sheet. When such a sheet is wrapped around the pipe, both the wedges and grooves close to enable the inner surface of the insulating sheet to closely conform to the circumference of the pipe. Thus, when the insulation is in place, there are no objectionable voids in the insulation material surrounding the pipe. The present insulating sheet can still further be used to cover a pipe of relatively small diameter by removing all of the wedges in the manner described.

The present insulating sheet material thus provides the advantage that the applicator need only utilize one standard type of material for all of his insulating requirements. This material can quickly and economically be modified to suit it for any specific installation at hand.

These and other objects and advantages of the present invention will be more readily apparent from a consideration of the following detailed description of the drawings illustrating a preferred embodiment of the invention.

In the drawings:

FIGURE 1 is a perspective view of a sheet of one preferred form of insulating material fabricated in accordance with the present invention.

FIGURE 2 is a cross sectional view through a portion of the sheet taken generally along line 2—2 of FIGURE 1.

FIGURE 3 is a transverse cross sectional view through a pipe of relatively large diameter covered with the present insulating sheet.

FIGURE 4 is an end view of a flat insulating sheet before it is wrapped around the pipe of FIGURE 3.

FIGURE 5 is a transverse cross sectional view through a pipe of intermediate diameter covered with a sheet of the present insulating material from which every other wedge has been removed.

FIGURE 6 is an end view of the sheet covering the pipe in FIGURE 5 showing the sheet in a flat condition.

FIGURE 7 is a transverse cross sectional view through a pipe of relatively small diameter covered with an insulating sheet of the present invention from which every wedge has been removed.

FIGURE 8 is an end view of the sheet covering the pipe in FIGURE 7 showing the sheet in a flat position.

One preferred form of insulating material constructed in accordance with the principles of the present invention is shown in FIGURES 1 and 2. As there shown, the insulating sheet 10 comprises a generally rectangular sheet of bonded fibrous material 11 to which is adhesively secured by backing layer 12 formed of a suitable material, such as a glass fiber mat or the like. If desired, an outer jacket sheet of suitable material, such as .016 thickness aluminum (not shown) can be joined to the undersurface of the glass fiber mat layer.

One preferred form of fibrous material comprises spun mineral fibers which are felted and bonded together with a suitable binder, such as a phenolic resin bonding material. A suitable density for this form of fibrous material is approximately eight pounds per cubic foot. The insulating material can be of any desired thickness, such as by way of example, one and one-half, two or three inches, depending upon the amount of insulation required. It is to be expressly understood, however, that the present invention can also be utilized in conjunction with other types of fibrous, or even molded, material as well as material of other densities and dimensions than those suggested for the preferred embodiment.

As is best shown in FIGURES 1 and 2, the fibrous layer 11 is provided with a plurality of parallel grooves 13. These grooves, which are formed in any suitable manner such as by means of a rotary saw, extend inwardly from one surface 14 of the sheet for a substantial portion of the depth of the sheet. The grooves are relatively narrow, for example three thirty-seconds of an inch, and are angulated with respect to a plane normal to the surface of the sheet, for example by an amount of thirty degrees. Adjacent grooves are oppositely angulated so that each pair of adjacent grooves, such as grooves 15 and 16 and 17 and 18 in FIGURE 2, define removable elongated wedge portions, such as wedge portions indicated at 20 and 21.

As is best shown in FIGURE 2, each of the grooves terminates along a line which is spaced from the under-surface 22 of the fibrous layer by a distance of, for example, one-half inch. The grooves of each pair also terminate at points laterally spaced from one another a small distance, for example three-eighths of an inch. Consequently, each of the wedges, such as wedges 20 and 21, is only partially cut and is retrained integral with the remainder of the surface by means of narrow uncut connecting strips 23 and 24. However, any or all of the wedges can be removed by manually tearing the wedge outwardly or by running a sharp implement along the bottom edge of the wedge to cut the interconnecting strips, such as strips 23 and 24.

The insulating sheet is shipped from the factory in the condition shown in FIGURE 1 with all of the wedges intact. The sheet can be used flat, as shown in FIGURE 4, if planar insulating material is required. The sheet can also be utilized in the form shown, i.e., without removing any of the wedges, to cover curved surfaces of relatively large diameter, for example a pipe of twelve-inch diameter. When the insulating material is wrapped around a pipe, upper surface 14 having the cuts formed therein is placed against the surface of the pipe and the material is wrapped around the pipe in the manner shown in FIGURE 3. It is to be understood that the material is retained by suitable straps, or the like, which are conventional in the art and are not shown in detail. When the insulating material is wrapped around the pipe, the opposite sides of the grooves 13 are forced together so that the grooves are closed and the insulating material fits snugly around the pipe.

When the insulation material is to be applied to a pipe of intermediate diameter, for example a pipe of eight inch diameter, every other wedge is removed from the material at the job side so that before application the insulating sheet has the appearance of the sheet in FIGURE 6. Again the sheet is wrapped around the pipe with surface 14 against the outer circumference of pipe 26. This time both the V-shaped wedges and the slots close so that the insulating material conforms to the pipe circumference.

The present insulating material can also be used to cover a pipe of relatively small diameter, for example a four inch pipe. When the material is used in this manner, every wedge is removed so that when the material is flat it has the appearance shown in FIGURE 8. Again, the material is wrapped around the pipe with the surface 14 in engagement with the pipe circumference. When the material is secured around the pipe, the wedges close so that the inner surface of the sheet conforms to the pipe circumference and the voids are filled to provide optimum insulation.

It is to be understood that the exact number of wedges removed for a given pipe size depends upon the thickness of the insulating sheet and the exact angulation and spacing of the wedge defining cuts. The glass fiber backing layer 12 functions to strengthen the fibrous layer 11 and prevents it from tearing adjacent to the inner edges of the removed wedges.

From the above disclosure of the general principles of the present invention and the foregoing description of a preferred embodiment, those skilled in the art will readily comprehend various modifications to which the invention is susceptible. Accordingly, I desire to be limited only by the scope of the following claims.

Having described my invention, I claim:

1. An annular insulating layer for a pipe comprising a layer of flexible, bonded fibrous insulating material surrounding said pipe and having a plurality of parallel cuts formed therein adjacent to the pipe, a backing layer bonded to said insulating material on the outer surface thereof remote from said cuts, said cuts being grouped in pairs, each of said cuts being angulated relative to a plane normal to the surface of said insulating material, the cuts of each pair being oppositely oriented with respect to said normal to define a selectively removable wedge, each of said cuts terminating in an inner edge spaced from the other cut of said pair, so that each of said wedges is joined to the remainder of said insulating material by a thin band, the cuts adjacent said pipe being closed, said wedges assuming an arcuate configuration and closely conforming to the circumference of a pipe of relatively large diameter and whereby upon selective removal of a plurality of said wedges said insulating material is adapted to closely conform to the circumference of a pipe of any of a wide range of smaller diameters.

2. An annular insulating layer for a pipe comprising a layer of flexible, bonded fibrous insulating material surrounding said pipe having a plurality of parallel cuts formed therein, a backing layer bonded to said insulating material on the outer surface thereof remote from said cuts, said cuts being grouped in pairs, each of said cuts being angulated relative to a plane normal to the surface of said insulating material, the cuts of each pair being oppositely oriented with respect to said normal to define a selectively removable wedge, each of said cuts terminating in an inner edge spaced from the other cut of said pair, a plurality of said wedges being selectively removed, the remainder of said wedges being joined to the insulating material by areas intermediate said cuts, the cuts and removed wedges being closed adjacent said pipe, said remaining wedges assuming an arcuate configuration and closely conforming to the circumference of a pipe of any of a wide range of diameters corresponding to the number and position of wedges removed.

References Cited

UNITED STATES PATENTS

| | | | |
|---|---|---|---|
| 1,734,209 | 11/1929 | Huffine | 138—149 |
| 2,142,548 | 1/1939 | Anderson | 161—117 X |
| 2,776,231 | 1/1957 | Brown | 138—141 |
| 3,092,529 | 6/1963 | Pearson | 138—149 |

LAVERNE D. GEIGER, *Primary Examiner.*

T. L. MOOREHEAD, *Assistant Examiner.*